(12) United States Patent
Krijn et al.

(10) Patent No.: US 8,393,774 B2
(45) Date of Patent: Mar. 12, 2013

(54) LUMINAIRE KIT AND METHOD

(75) Inventors: Marcellinus Petrus Carolus Michael Krijn, Eindhoven (NL); Oscar Hendrikus Willemsen, Eindhoven (NL); Michel Cornelis Josephus Marie Vissenberg, Eindhoven (NL); Ramon Pascal Van Gorkom, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 298 days.

(21) Appl. No.: 12/992,311

(22) PCT Filed: May 15, 2009

(86) PCT No.: PCT/IB2009/052036
§ 371 (c)(1),
(2), (4) Date: Nov. 12, 2010

(87) PCT Pub. No.: WO2009/141778
PCT Pub. Date: Nov. 26, 2009

(65) Prior Publication Data
US 2011/0069508 A1 Mar. 24, 2011

(30) Foreign Application Priority Data
May 22, 2008 (EP) .................................... 08156703

(51) Int. Cl.
*F21V 7/04* (2006.01)
*F21V 8/00* (2006.01)

(52) U.S. Cl. ........ 362/612; 362/602; 362/615; 362/617; 362/84; 362/609

(58) Field of Classification Search .................... 362/84, 362/602, 609, 612, 615, 617
See application file for complete search history.

(56) References Cited

U.S. PATENT DOCUMENTS

| | | | |
|---|---|---|---|
| 5,708,428 A | 1/1998 | Phillips | |
| 6,604,841 B2 | 8/2003 | Liu | |
| 6,840,655 B2 | 1/2005 | Shen | |
| 7,188,989 B2 | 3/2007 | Miyashita | |
| 8,047,696 B2 * | 11/2011 | Ijzerman et al. | 362/609 |
| 8,129,731 B2 * | 3/2012 | Vissenberg et al. | 257/88 |
| 2003/0072155 A1 | 4/2003 | Liu | |
| 2004/0246719 A1 | 12/2004 | Shen | |
| 2005/0174802 A1 | 8/2005 | Wu et al. | |
| 2006/0002146 A1 | 1/2006 | Baba | |
| 2006/0072314 A1 | 4/2006 | Rains | |
| 2007/0064418 A1 | 3/2007 | Huang et al. | |
| 2007/0121340 A1 | 5/2007 | Hoshi | |
| 2008/0037284 A1 | 2/2008 | Rudisill | |

FOREIGN PATENT DOCUMENTS
CN 200965837 Y 10/2007
EP 1867915 A1 12/2007
(Continued)

*Primary Examiner* — Stephen F Husar
*Assistant Examiner* — James Cranson, Jr.
(74) *Attorney, Agent, or Firm* — Mark L. Beloborodov

(57) ABSTRACT

It is provided a luminaire kit of parts (100) for assembling a luminaire. The luminaire kit of parts (100) comprises light sources (107*a-b*) and light out-coupling devices (105*a-b*), The luminaire kit of parts (100) further comprises a light guiding element (101), the light guiding element (101) being configured to receive at least a subset of the light sources (107*a-b*) and at least a subset of the light out-coupling devices (105*a-b*) into a first type of 5 openings (103*a-c*) and a second type of openings (104*a-b*) respectively. It is also provided a method for assembling a luminaire.

11 Claims, 8 Drawing Sheets

FOREIGN PATENT DOCUMENTS

| | | |
|---|---|---|
| JP | 61295517 A | 12/1986 |
| JP | 2007141546 A | 6/2007 |
| WO | 2005059872 A1 | 6/2005 |
| WO | 2007046059 A1 | 4/2007 |

* cited by examiner

LUMINAIRE KIT AND METHOD

TECHNICAL FIELD

The invention relates to the field of lighting, and more specifically luminaires. The invention also relates to a method of assembling a luminaire.

BACKGROUND OF THE INVENTION

Luminaires based on light emitting diodes (LEDs) are becoming increasingly popular. By using several light sources, light designers can create simple as well as complex light effects, for instance color effects and dynamic effects in order to enhance the atmosphere of interiors and exteriors. Lighting systems based on LEDs have more degrees of freedom to benefit from, compared to traditional lighting with respect to, for instance, color, form factor, directionality, and ease of installation. Therefore LED-based lighting systems are more convenient when creating various light effects.

LEDs are available in many different colors, they are small and they are becoming very efficient and affordable.

U.S. Pat. No. 6,840,655, for example, discloses a LED light set including a flexible plastic tube having an axially extended passage hole and light guide hole and a plurality of inside lamp holes radially extended between the passage hole and the light guide hole.

A problem with existing LED luminaires is that they are not very easy to modify in respect of the obtained light effect.

SUMMARY OF THE INVENTION

It is desirable to achieve an improvement over prior art. A particular object is to provide for a more versatile assembly of luminaires.

According to a first aspect of the present invention, it is provided a luminaire kit of parts for assembling a luminaire, the kit of parts comprising: a set of light sources, a set of light out-coupling devices, and a light guiding element having a first type of openings configured to receive at least a subset of light sources of said set of light sources, and a second type of openings configured to receive at least a subset of light out-coupling devices of the set of light out-coupling devices.

By providing a luminaire kit of parts, a user may assemble a luminaire according to his or her liking.

The light guiding element may comprise grooves for being able to divide said light guiding layer along said grooves. The grooves may enable a user to shape the light guiding layer into a desired size and shape by breaking the layer along a groove.

Each light out-coupling device may comprise a light redirector. A light redirector may allow light to leave the light guiding element.

The light redirector may comprise any of a collimator, a mirror, and an optical fiber. A light redirector may thus provide different types of lighting effects.

The light redirector may comprise phosphor, the phosphor being excitable by light from the set of light sources. Phosphor may absorb light of a first wavelength, and subsequently emit light of another wavelength, depending on the characteristics of the phosphor.

The first and/or the second type of openings may extend through the light guiding element, that is, the opening is a through hole of the light guiding element.

At least a subset of the second type of openings may be configured to receive the light out-coupling devices from any of a first side of the light guiding element and a second side of the light guiding element, opposite to the first side. By being able to assemble light out-coupling devices to the light guiding layer from two opposite sides, a luminaire with light emanating properties in two opposite directions may be created. For example, two opposite walls of a room may be illuminated simultaneously, or both a floor and a ceiling may be illuminated simultaneously.

The first type of openings and the second type of openings may extend through said light guiding element.

The first type of openings and the second type of openings may be of the same type. With one type of openings, assembling a luminaire may be flexible in that there may be no discrimination of the reception of light sources and light out-coupling devices, which provides flexibility for the assembly of the luminaire.

The light guiding element may comprise light diverters associated with the first type of openings, the light diverters being configured to direct light in a direction towards the second type of openings. By directing light towards the second type of openings, more light will be directed towards the second type of openings for the light out-coupling devices to be out-coupled.

The light out-coupling devices may have fasteners for fastening the light out-coupling devices to the light guiding element, enabling the light out-coupling devices to be detachable from the light guiding element.

The luminaire kit of parts may further comprise a set of light guiding element complements, the set of light guiding element complements being configured to be receivable in the first type of openings and the second type of openings, wherein light guiding elements complements of the set of light guiding element complements are configured to patch the first type of openings and the second type of openings.

The set of light sources may be a set of side-emitting LEDs. Side-emitting LEDs may emit light in side directions into a flat light guiding element, such as a light guiding layer.

The set of light out-coupling devices may comprise at least a pair of light out-coupling devices that are mutually structurally different. This may provide different type of lighting effects of a luminaire, and thus a more flexible and customer-specific luminaire.

According to a second aspect of the present invention, a luminaire is provided, the luminaire being assembled from the luminaire kit of parts according to the first aspect of the present invention.

Relating to this second aspect, there is provided a luminaire comprising:
  a set of light sources,
  a set of light out-coupling devices,
  a light guiding element having a first type of openings configured to receive at least a subset of light sources of said set of light sources, and a second type of openings configured to receive at least a subset of light out-coupling devices of the set of light out-coupling devices.

In an embodiment said light guiding element comprises grooves for being able to divide said light guiding layer along said grooves.

In an embodiment each light out-coupling device comprises a light redirector.

In an embodiment said light redirector comprises a collimator, a mirror, or an optical fiber or a combination thereof.

In an embodiment said light redirector comprises phosphor, said phosphor being excitable by light from said set of light sources.

In an embodiment said first type of openings and/or said second type of openings extend through said light guiding element.

In an embodiment at least a subset of said second type of openings are configured to receive said light out-coupling devices from any of a first side of said light guiding element and a second side of said light guiding element, opposite to said first side.

In an embodiment said first type of openings and said second type of openings are of the same type.

In an embodiment the light guiding element comprises light diverters associated with said first type of openings, said light diverters being configured to direct light in a direction towards said second type of openings.

In an embodiment said set of light out-coupling devices have fasteners for fastening said light out-coupling devices to said light guiding element, enabling said light out-coupling devices to be detachable from said light guiding element.

In an embodiment the luminaire further comprises a set of light guiding element complements, said set of light guiding element complements being configured to be receivable in said first type of openings and said second type of openings, wherein light guiding elements complements of said set of light guiding element complements are configured to patch said first type of openings and said second type of openings.

In an embodiment said set of light sources is a set of side-emitting LEDs.

In an embodiment the set of light out-coupling devices comprises at least a pair of light out-coupling devices that are mutually structurally different.

According to a third aspect of the present invention, it is provided a method of assembling a luminaire, the method comprising the steps of:

arranging, in a light guiding element, a set of light sources in a first type of openings configured to receive the set of light sources; and arranging, in the light guiding element, any one of a plurality of light out-coupling devices in a second type of openings configured to receive any of the light out-coupling devices.

It should be noted that the term "luminaire" means a device that is used for providing light in a room, for purpose of illuminating objects in the room. A room is in this context typically an apartment room or an office room, a gym hall, a room in a public place or a part of an outdoor environment, such as a part of a street. Accordingly, a luminaire is not, for example, a video projector or a backlight for a TV or mobile phone.

Generally, the third aspect has the same features and advantages as the first and second aspects.

BRIEF DESCRIPTION OF THE DRAWINGS

The invention will now be described in further detail by way of example under reference to the accompanying drawings.

DETAILED DESCRIPTION OF EMBODIMENTS

Figure 1:
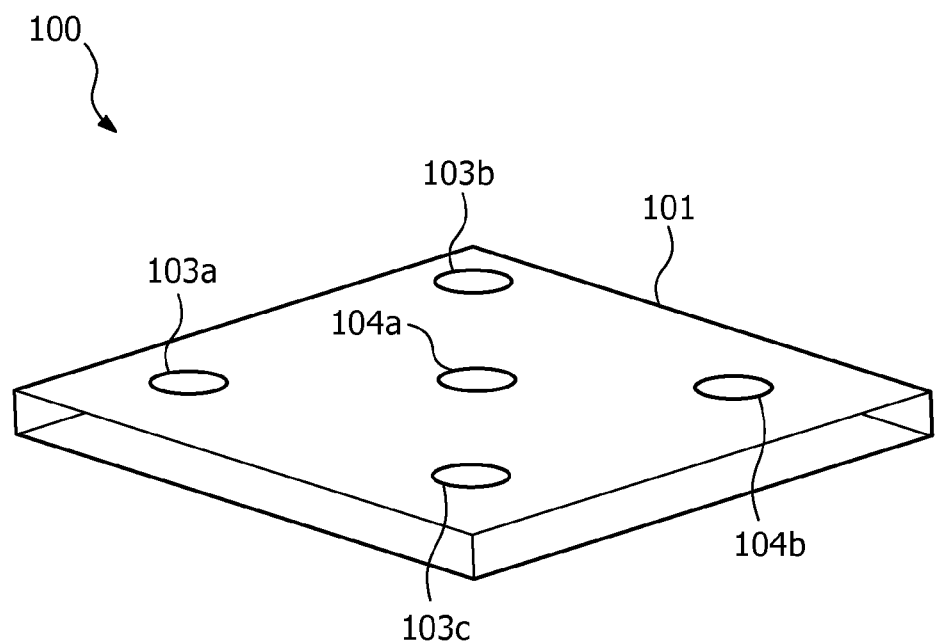
FIG. 1 shows a schematic view of a luminaire kit of parts according to the invention.
Figure 1:
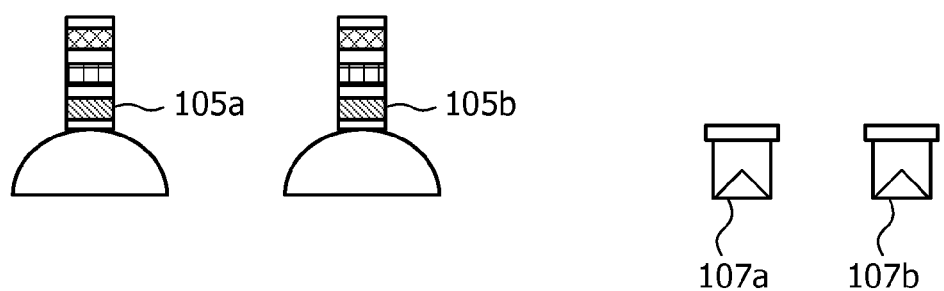

FIG. 1 shows a schematic view of a luminaire kit of parts according to an embodiment of the invention. The luminaire kit of parts 100 comprises a light guiding element 101, a first type of openings 103a-c, a second type of openings 104a-b, a set of light sources 107a-b, a set of light out-coupling devices 105a-b. At least a pair of light out-coupling elements 105a-b of the set of light out-coupling elements 105a-b can be mutually structurally different (not shown in FIG. 1). The light guiding element can e.g. be a light guiding layer. The layer can e.g. be in the form of a plate. The light sources 107a-b can be side-emitting LEDs.

The first type of openings 103a-c can be utilized for directing light into the light guiding element 101, and the second type of openings 104a-b can be utilized for directing light out of the light guiding element 101. The openings can extend through the light guiding element 101, thus forming holes in the light guiding element 101. The light guiding element 101 can be flexible in shape and it can be slim. It can be possible to create a curved design of the light guiding element 101.

Below, the set of light sources 107a-b will be exemplified by a set of side-emitting LEDs. However, the light sources 107a-b can be any type of suitable light sources, such as e.g. halogen light sources or organic LEDs. Moreover, the light guiding element 101 will be exemplified by a light guiding layer, although the light guiding element 101 could be any kind of light guiding element suitable for guiding light of light sources.

Figure 2:
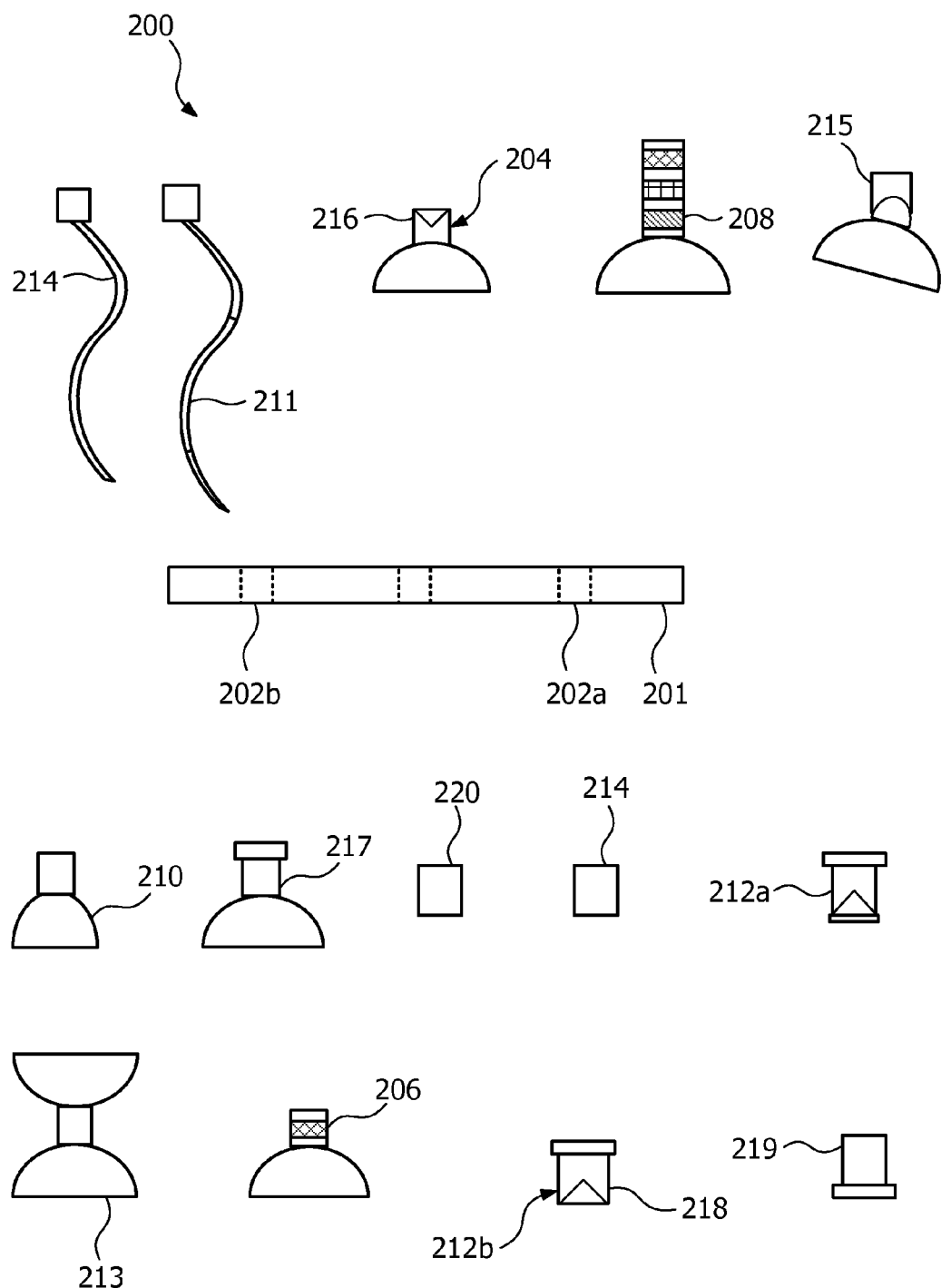
FIG. 2 shows a schematic view of a luminaire kit of parts according to the invention.

FIG. 2 shows a side view of a luminaire kit of parts 200. The luminaire kit of part 200 in this example comprises a light guiding layer 201 with a first type of openings 202a and a second type of openings 202b. The first type of openings 202a, and the second type of openings 202b can be of the same type. The light guiding layer can be made of for instance poly-methyl-methacrylate, poly-carbonate, cyclo-olefin co-polymer, or poly-styrene. The luminaire kit of parts further comprises a set of side-emitting LEDs 212a-212b, and a set of light out-coupling devices 204, 206, 208, 210, 211, 213, 215, 217, and 219. Light out-coupling device 204 comprises a fastener 216. The light out-coupling devices 204 and 206 are examples of a first and a second type of light out-coupling devices that are structurally different. Such differences will be described in more detail below.

The side-emitting LED 212b comprises a fastener 218. Each side-emitting LED 212a-212b comprises an insert part with a fastener 218. Each light out-coupling device 204, 206, 208, 210, 211, 213, 215, 217, and 219 can comprise a fastener 216. The fastener 216 and fastener 218 can be of the same type. The fastener can for instance be a screw, a magnet, or a tight fitting plug. If the fastener 216 is a screw, the light guiding layer 201 comprises a thread. If the fastener 216 is a magnet, the light guiding layer can comprise a ferromagnetic material. The luminaire kit of parts 200 further comprises light guiding layer complements 220. The light guiding layer complement 220 can be placed in the first type of opening 202a or the second type of opening 202b, in order to prevent light from escaping from the light guiding layer 201 by filling the first type of opening 202a and the second type of opening 202b. Alternatively the light guiding layer complement 214 can be placed in the first type of opening 202a and the second type of opening 202b. The light guiding complement 214 fills the first type of opening 202a and the second type of opening 202b. The light guiding layer complement 214 can, when received by a second type of opening 202b, be in level with the light guiding layer 201.

A refraction index $n_1$ of an insert part, configured to be in contact with the light guiding layer 201, of the light out-coupling devices 204, 206, 208, 210, 211, 213, 215, 217, and 219 can be equal or larger than a refraction index $n_2$ of the light guiding layer 201. This ensures a good out-coupling efficiency for light out-coupling devices 204, 206, 208, 210, 211, 213, 215, 217, and 219 in optical contact with the light guiding layer 201.

A user can create his own desired ambient lighting environment by assembling a luminaire from the luminaire kit of parts 200. The luminaire kit of parts 200 can thus, for instance, be assembled outside of a luminaire factory, for example at the home of an end-user. Thus, an end-user can customize his lighting in order to achieve a desired lighting effect by placing light out-coupling devices 204, 206, 208, 210, 211, 213, 215, 217, and 219 in the second type of openings 202b. Alternatively, the side-emitting LEDs 212a and 212b can be detachable in order to alter the appearance of the luminaire. The light out-coupling devices 204, 206, 208, 210, 211, 213, 215, 217, and 219 can be detachable, in order to alter the appearance of the luminaire. A user can thus alter the appearance of the luminaire after assembly, by changing the configuration of side-emitting LEDs 212a and 212b and/or by changing the configuration of the light out-coupling devices 204, 206, 208, 210, 211, 213, 215, 217, and 219 by placing these in the desired second openings 202b.

Figure 3:
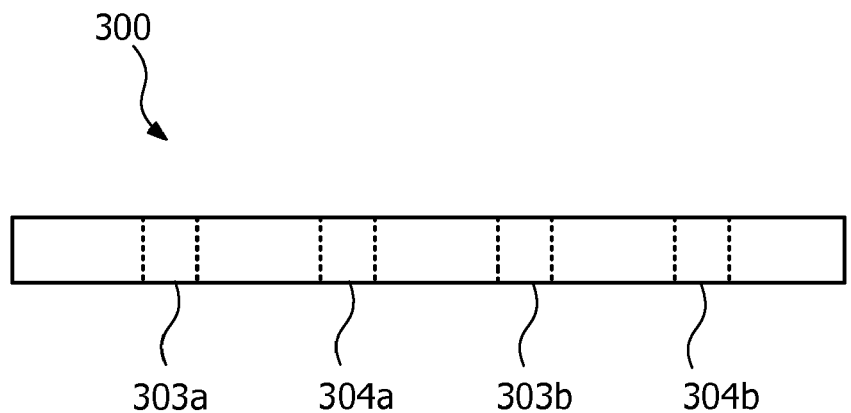
FIG. 3 shows a side view of a light guide.

FIG. 3 shows a side view of a light guiding layer 300. The light guiding layer 300 comprises a first type of openings 303a-b and a second type of openings 304a-b extending through the light guiding layer 300.

Figure 4:
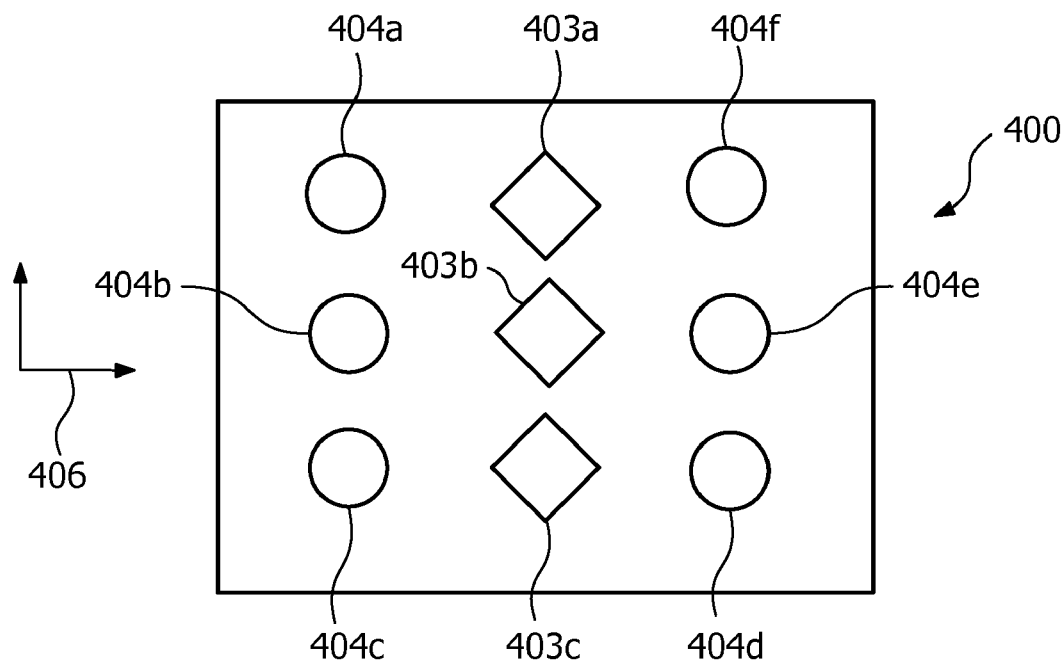
FIG. 4 shows a top view of a light guide.

FIG. 4 shows a top view of a light guiding layer 400. The light guiding layer 400 comprises a first type of openings 403a-c for receiving side-emitting LEDs. Each first type of opening 403a-c can for instance receive one side-emitting LED. The light guiding layer 400 further comprises a second type of openings 404a-f for receiving light out-coupling devices. Each second type of opening 404a-f can for instance receive one light out-coupling device. 406 is a coordinate system illustrating a plane of main light propagation directions. The first type of openings 403a-c and the second type of openings 404a-f can extend through the light guiding layer 400 in a direction perpendicular to the main light propagation direction. Alternatively, only the first type of openings 403a-c extend through the light guiding layer 400, in a direction perpendicular to the main light propagation direction. Alternatively, only the second type of openings 404a-f extend through the light guiding layer 400, in a direction perpendicular to the main light propagation direction. The first type of openings 403a-c and the second type of openings 404a-f can be arranged according to a predetermined pattern, such as rows and columns. Alternating rows can have the first type of openings 403a-c and the second type of openings 404a-f respectively. Alternatively, alternating columns can have the first type of openings 403a-c and the second type of openings 404a-f respectively. The first type of openings 403a-c and the second type of openings 404a-f can also be arranged in other ways, for instance, the first type of openings 403a-c and the second type of openings 404a-f can be arranged alternating in rows and columns.

Figure 5:
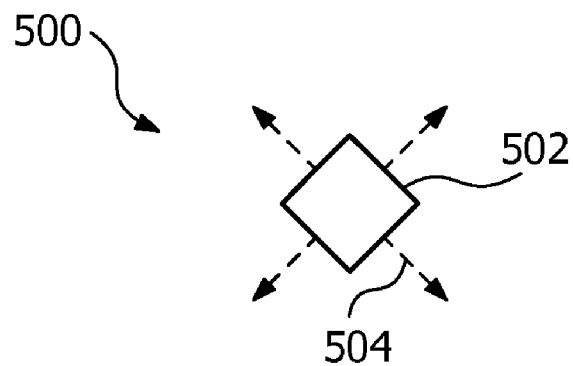
FIG. 5 shows a top view of a side-emitting LED.

FIG. 5 shows a top view of a side-emitting LED 500. The side emitting LED 500 is rhombus-shaped. The side-emitting LED 500 comprises four sides 502 configured to emit light 504. The side-emitting LED 500 can for instance be placed in one of the first type of openings 403a-c of FIG. 4.

Figure 6:
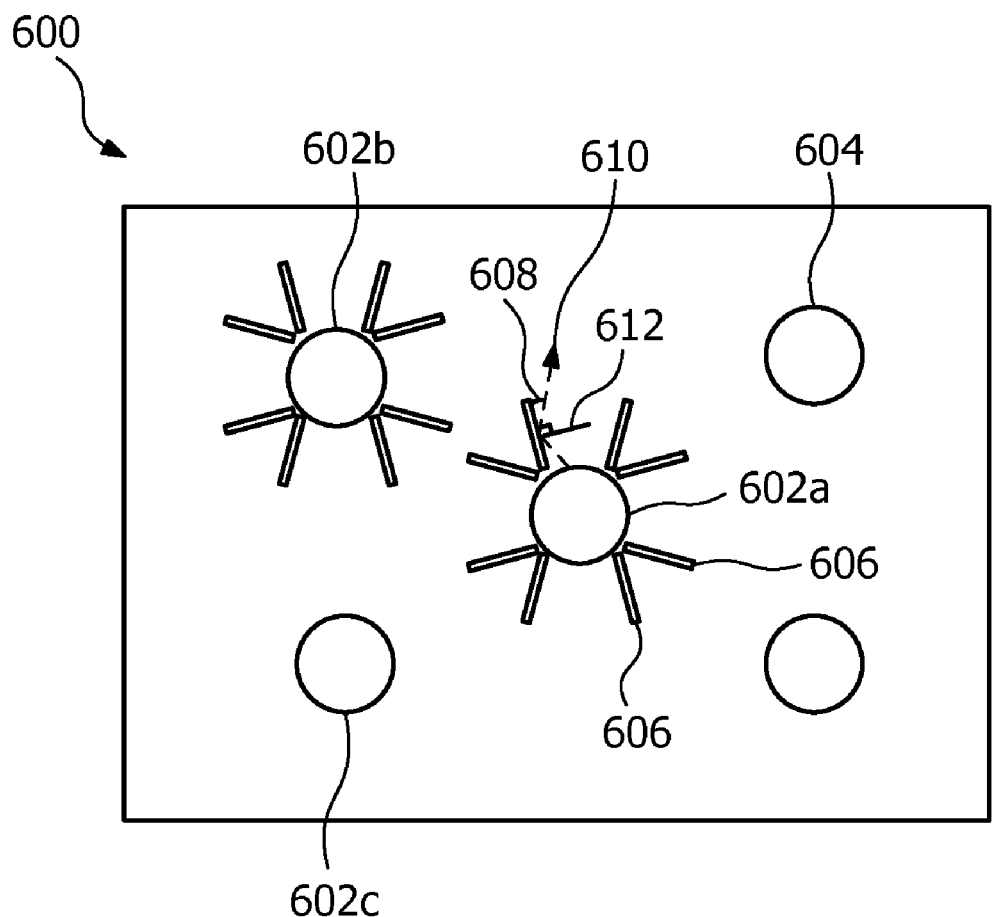
FIG. 6 shows a top view of a light guide.

FIG. 6 shows a top view of a light guiding layer 600. The light guiding layer 600 comprises a second type of openings 604, each second type of opening 604 being arranged to receive light out-coupling devices. A first type of openings 602a-c are arranged to receive a side-emitting LED. The light guiding layer comprises light diverters 606. Each light diverter 606 can be an air-slit in the light guiding layer 600. If incident light 610 emanating from, for instance a side-emitting LED fitted into the opening 602a, hits a light diverter 606, the light 610 can be reflected away from the first type of opening 602b-c, if an angle 608 of the incident light 610 is equal to, or larger than a total internal reflection angle. 612 illustrates a normal of a light diverter 606. The light diverter 606 can be arranged in pairs. The light diverter 606 can be arranged symmetrically around the first type of opening 602a and 602b. Alternatively, there can correspond a set of light diverters 606 for each first type of opening 602a-c. The light diverter 606 can direct light towards the second type of opening 604.

Figure 7:
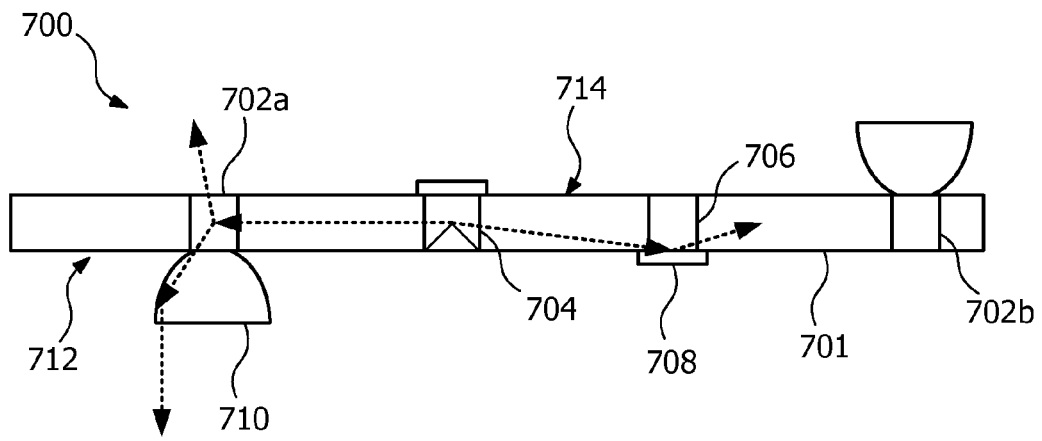
FIG. 7 shows a side view of a modular luminaire according to the invention.

FIG. 7 shows a side view of a luminaire 700. The luminaire 700 can be assembled from the luminaire kit 200 of FIG. 2. The luminaire 700 comprises a side-emitting LED 704, light out-coupling devices 702a-702b, a light out-coupling device 706, and a light guiding layer 701. The side-emitting LED 704 can emit light in various directions in the light guiding layer 700. The side-emitting LED 704 can for instance emit light 360 degrees, in a plane of the coordinate system 406 of FIG. 4. Alternatively, the side-emitting LED 704 can emit light in directions as described with reference to FIG. 5. Other variations are also possible. The side-emitting LED 704 can for instance be hexagonal.

The side-emitting LED 704 is placed in a first type of opening arranged for receiving a side-emitting LED 704. Alternatively, each opening of the light guiding layer 701 can receive both side-emitting LEDs 704 and light out-coupling devices 702 and 706.

The light out-coupling devices 702a-b and 706 are placed in a second type of openings of the light guiding layer 701. As light is distributed from the side-emitting LED 704, the light passes through the light out-coupling devices 702a-b and 706. Light out-coupling device 702a comprises a collimator 710 that redirects light traveling inside the light guiding layer 701. Part of the light escapes out of the light guiding layer 701 in one direction, after being collimated. Another part of the light escapes in opposite directions.

The light out-coupling device 702b has been received by the light guiding layer 701 from an opposite side, a second side 714, of the light guiding layer 701 with respect to the light out-coupling device 702a. The light out-coupling device 702a has been received from a first side 712.

The light out-coupling device 706 comprises a mirror 708 so that light will not escape in a direction blocked by the mirror 708. The light can escape from the light guiding layer 701 in a direction opposite a side of the light guiding layer 701 where the mirror 708 is situated.

Figure 8:
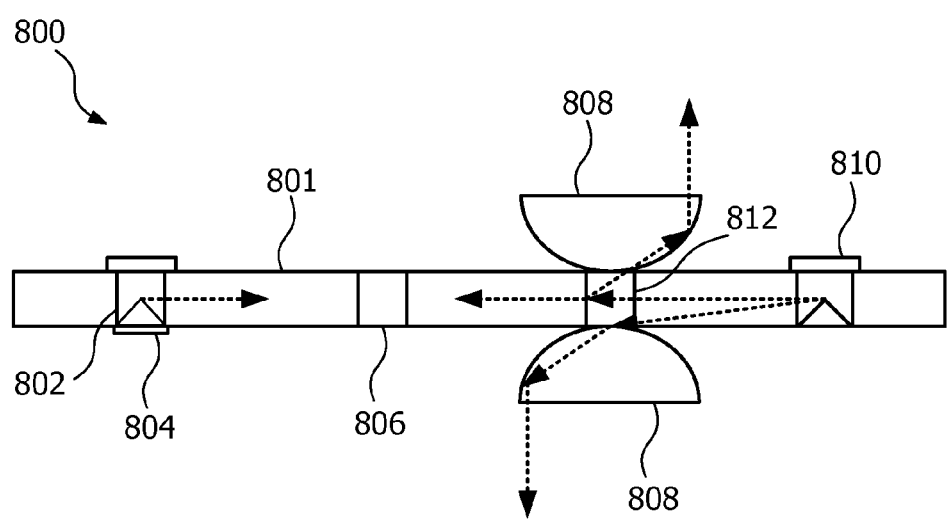
FIG. 8 shows a side view of a modular luminaire according to the invention.

FIG. 8 shows a side view of a luminaire 800. The luminaire 800 can be assembled from the luminaire kit 200 of FIG. 2. The luminaire 800 comprises a light guide 801, a side-emitting LED 810, a side-emitting LED 802 comprising a mirror 804, a light out-coupling insert 806, and a light out-coupling insert 812 comprising collimators 808. The collimators 808 of the out-coupling device 812 collimate incident light out of the light guiding layer 801, in opposite directions. The mirror 804 of the side-emitting LED 802 can reduce light leakage out of the light guiding layer 801 in a vicinity of the side-emitting LED 802, in a direction perpendicular to main light propagation directions of light in the light guiding layer 801. The light out-coupling insert 806 can be in level with a top surface and a bottom surface of the light guiding layer 801. It can direct light out of the light guiding layer 701 for instance by comprising a scattering material such as TiO2 particles. The top surface and bottom surface can be parallel with a plane spanned by the coordinate system 406 of FIG. 4.

Figure 9:
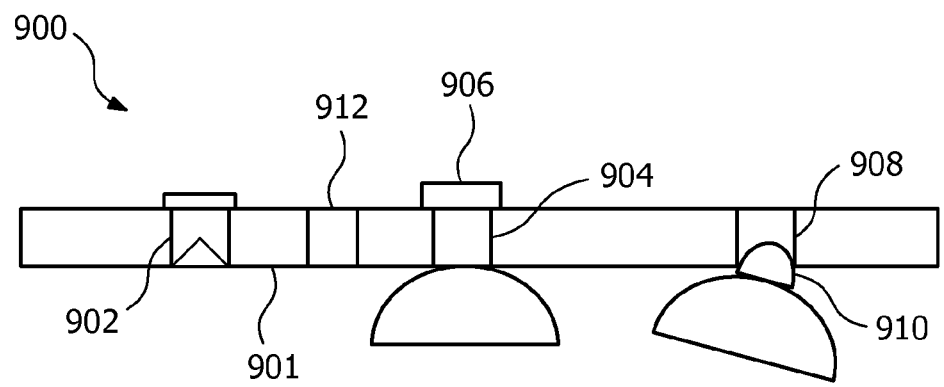
FIG. 9 shows a side view of a modular luminaire according to the invention.

FIG. 9 shows a side view of a luminaire 900. The luminaire 900 can be assembled from the luminaire kit 200 of FIG. 2. The luminaire 900 comprises a light guiding layer 901, a side-emitting LED 902, a light out-coupling device 904, a light out-coupling device 908 comprising an adjustable collimator 910, and a light guiding layer complement 912. The light out-coupling device 904 comprises a fastener 906, such as a screw, a magnet, or an anchor for example. Each type of light out-coupling device can comprise a fastener 906.

The adjustable collimator 910 can for instance be tilted in any direction towards the light guiding layer 901.

Figure 10:
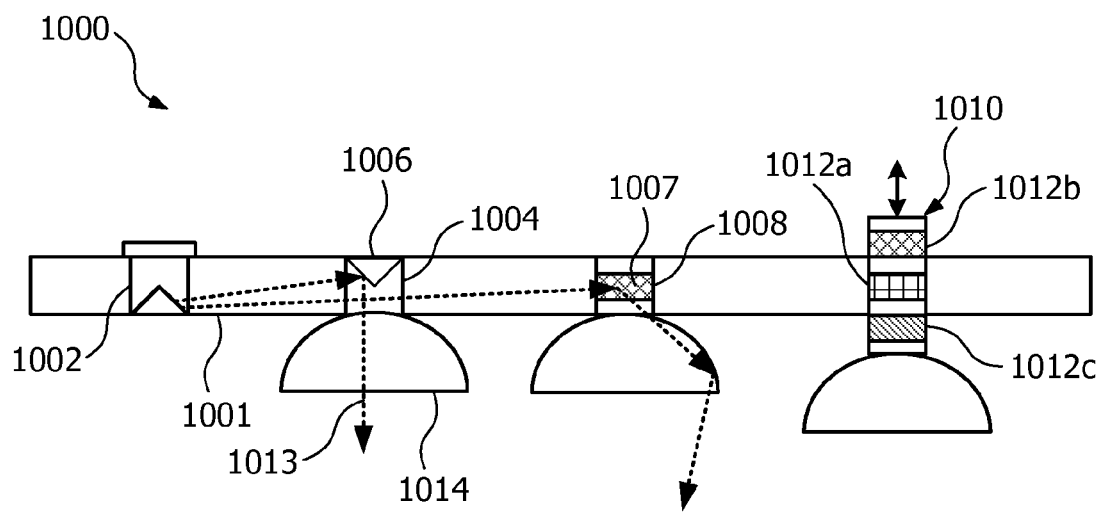
FIG. 10 shows a side view of a modular luminaire according to the invention.

FIG. 10 shows a side view of a luminaire 1000. The luminaire 1000 can be assembled from the luminaire kit 200 of FIG. 2. The luminaire comprises a light guiding layer 1001, a side-emitting LED 1002, a light out-coupling device 1004, a light out-coupling device 1008, and a light out-coupling device 1010. The light out-coupling device 1004 comprises a mirror 1006 at an oblique angle with respect to an average direction of light traveling inside the light guiding layer 1001, which redirects incident light, with some parts of the redirected light leaving the light guiding layer 1001. The reflection can be based on total internal reflection. After light 1013 is redirected, the light 1013 can be collimated by collimator 1014. The collimator can be based on a reflection funnel in air.

The light out-coupling device 1008 comprises a scatterer 1007. The scatterer 1007 can be a scattering material, for instance TiO$_2$ particles, dispersed into a transparent material of light out-coupling device 1008, in contact with the light guiding layer 1001. Light traveling inside the light guiding layer 1001 can scatter when hitting the scatterer 1007 and leave the light guiding layer 1001. Another example of a scattering material is phosphor. By using a side-emitting LED 1002 with short wavelengths in the visual spectrum, such as blue light, or UV-light, phosphors can convert light from the side-emitting LED 1002 into other colors. For instance, by using a blue (with wavelength 450 nm) side-emitting LED 1002, and using yellow phosphor, that can convert the blue light of the side-emitting LED 1002 into a broadband yellow light, can result in white light, because non-converted blue light from the side-emitting LED 1002 and light emitted by the phosphor can render white light. By using phosphors, many colors and many color combinations can be possible. A user can, from the luminaire kit of parts 200 of FIG. 2 assemble a modular luminaire with different types of side-emitting LEDs 1002, emitting light with, for instance, different wavelength, or different intensity or a combination thereof Different light out-coupling devices 1008 can be used, with different type of phosphors.

The light out-coupling device 1010 comprises two different layers of phosphor. In a first layer 1012a, the phosphor can have a first color, wherein in a second layer 1012b, the phosphor can have a second color. A third layer 1012c can comprise a scatterer different than phosphor. The light out-coupling device 1010 can be movable in a direction perpendicular to the light guiding layer 1001, as indicated by the two-directional arrow. The first layer 1012a can comprise phosphor that absorbs light and emits red light. The second layer 1012b can comprise phosphor that absorbs light and emits green light. The scatterer 1012c can scatter blue light from a blue side-emitting LED 1002. Alternatively, any combination of color and scattering material of the first layer 1012a, the second layer 1012b and the third layer 1012c can be possible, which a skilled person would understand. Alternatively, the light out-coupling device 1010 can have different portions of the first layer 1012a, the second layer 1012b and the third layer 1012c sprinkled with different types of phosphor. The phosphor can extend around the light out-coupling device 1010. The light out-coupling device 1010 can be rotatable around a central axis of the light out-coupling device 1010, the central axis being defined in a direction perpendicular to the light guiding layer 1001. The light out-coupling device 1010 can be movable in a direction perpendicular to the light guiding layer 1001, as indicated by the two-directional arrow, and rotatable around a central axis of the light out-coupling device 1010, the central axis being defined in a direction perpendicular to the light guiding layer 1001.

Figure 11:
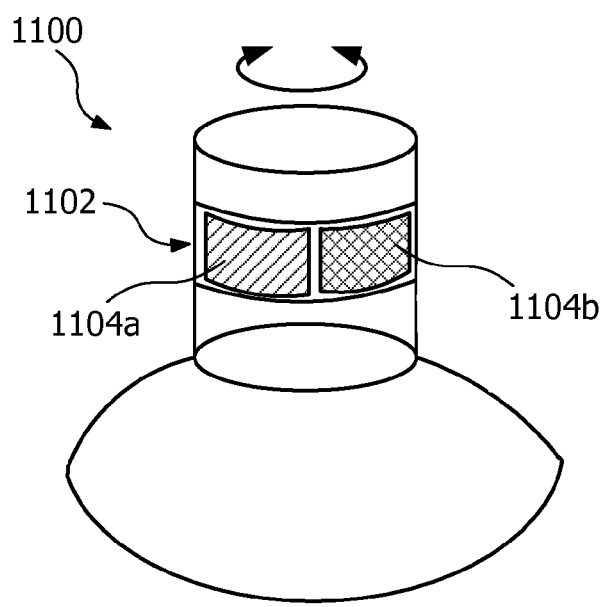
FIG. 11 shows a perspective view of a light out-coupling device.

FIG. 11 shows a perspective view of a light out-coupling device 1100. The light out-coupling device 1100 comprises a layer of phosphor 1102 as described in FIG. 10. The layer of phosphor 1102 is divided into a first part 1104a, and a second part 1104b. The phosphor of the first part 1104a and the phosphor of the second part 1104b can differ. Alternatively, the layer of phosphor can comprise a plurality of different parts of phosphor. The light out-coupling device 1100 is configured to be rotatable when inserted into a second type of opening of a light guiding layer.

Figure 12:
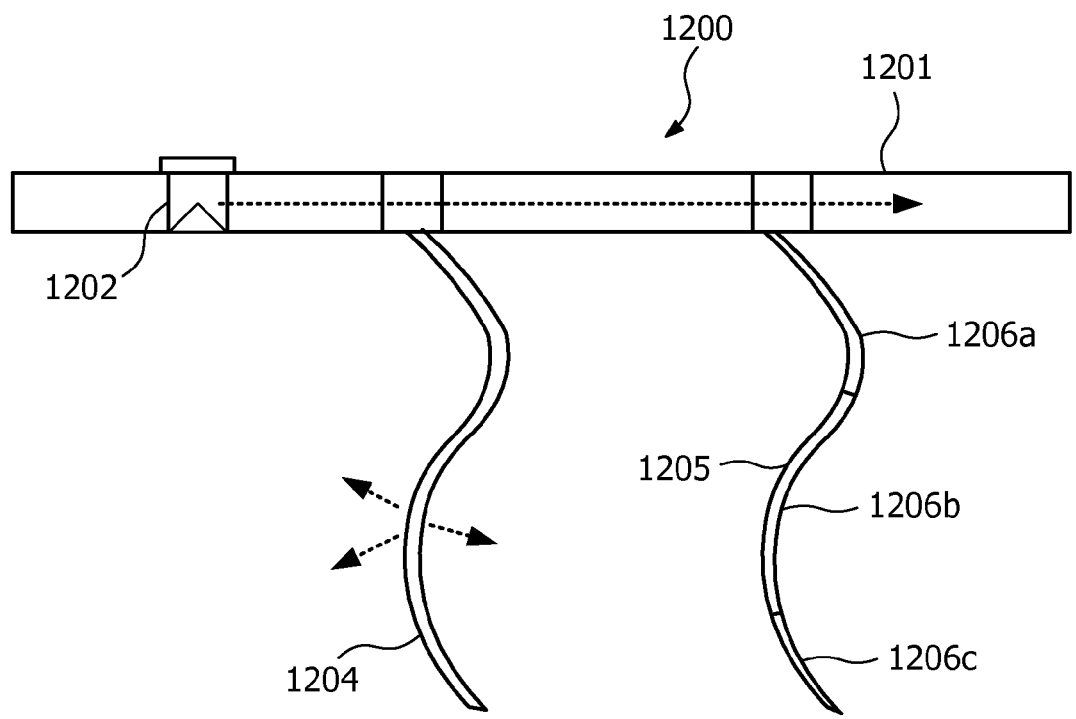
FIG. 12 shows a side view of a modular luminaire according to the invention.

FIG. 12 shows a side view of a luminaire 1200. The luminaire 1200 can be assembled from the luminaire kit 200 of FIG. 2. The luminaire comprises a light guiding layer 1201, a side-emitting LED 1202, and two light out-coupling devices 1204 and 1205. The light out-coupling devices 1204 and 1205 can be optical fibers. The optical fibers can be leaky optical fibers, meaning that the optical fibers leak light along their lengths. The light out-coupling device 1205 comprises a first layer 1206a, a second layer 1206b, and a third layer 1206c of phosphor. The first layer 1206a, the second layer 1206b, and the third layer 1206c can comprise different types of phosphor. Alternatively, each layer of the first layer 1206a, the second layer 1206b, and the third layer 1206c can comprise the same type of phosphor. Alternatively, the light out-coupling device can comprise a plurality of phosphor layers.

Figure 13:
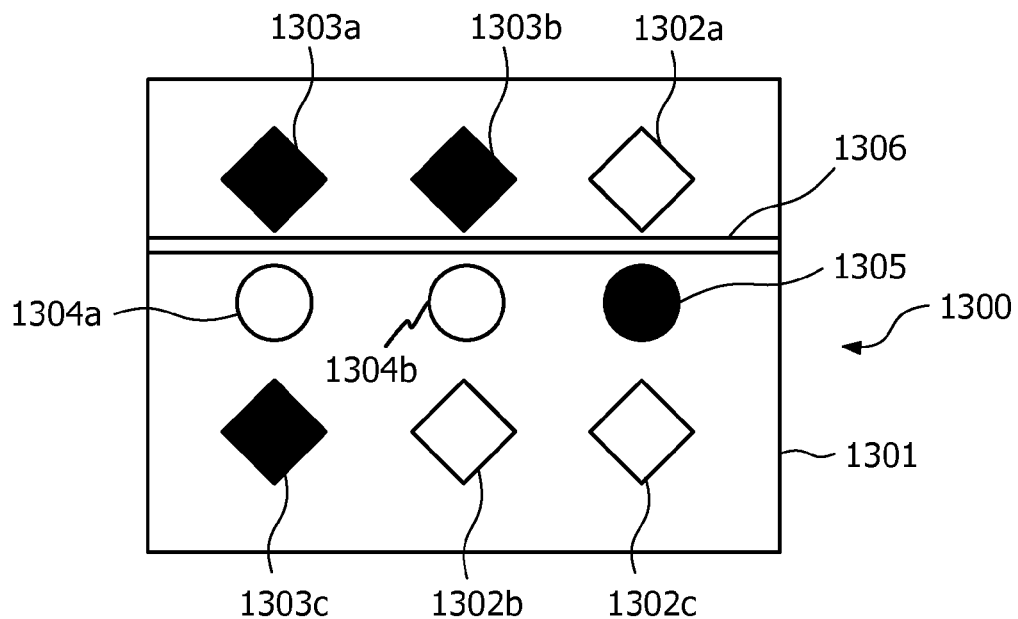
FIG. 13 shows a top view of a modular luminaire according to the invention.

FIG. 13 shows a top view of a luminaire 1300. The luminaire 1300 can be assembled from the luminaire kit 200 of FIG. 2. The luminaire 1300 comprises a light guiding layer 1301, a groove 1306, first type of openings 1302a-c, a second type of openings 1304a-b, side emitting LEDs 1303a-c placed into first type of openings, and a light out-coupling device 1305.

The groove 1306 can be used for dividing the luminaire into two parts. The light guiding layer 1301 can be divided when sufficient force is applied to the light guiding layer 1301 along the groove. Alternatively, there can be several grooves 1306, so that the luminaire 1300 can be divided into a plurality of parts. The grooves 1306 can be arranged in rows. Alternatively, the grooves 1306 can be arranged in columns, or rows and columns. The grooves 1306 can be arranged in irregular formations. The groove 1306 can be filled with an optically transparent material, for instance silicone rubber. The optically transparent material may help not to hamper light transport inside the light guiding layer 1301.

Some of the first type of openings 1302a-c, and second type of openings 1304a-b can be left open, without mounted side-emitting LEDs 1303a-c or light out-coupling device 1305.

Figure 14:
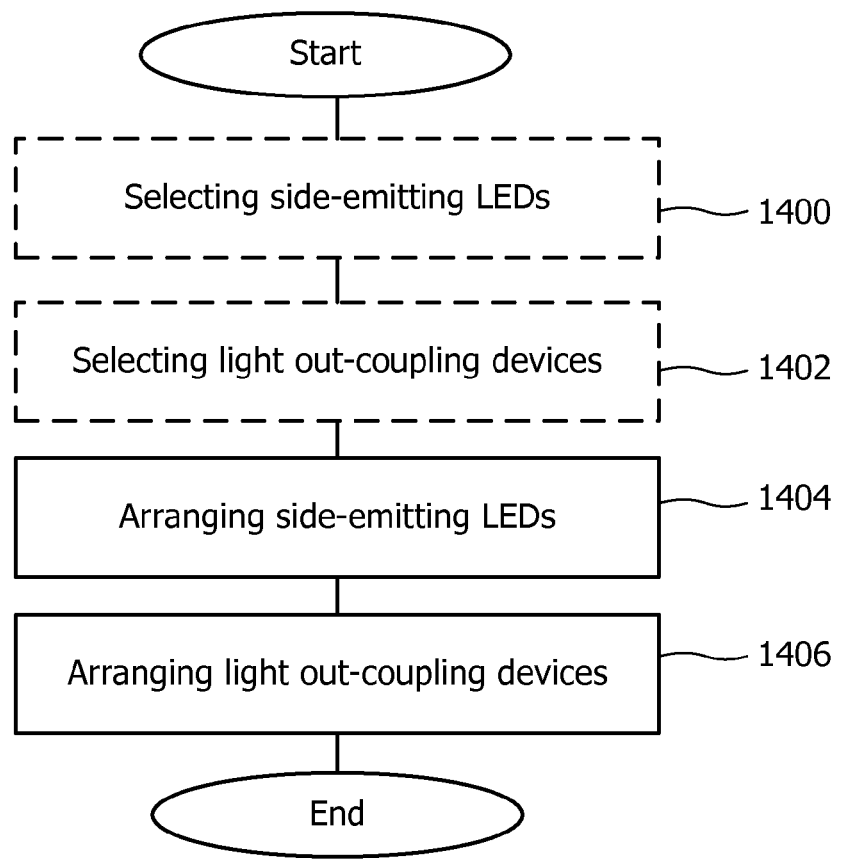
FIG. 14 shows schematically a method for assembling a luminaire from a luminaire kit of parts according to the invention.

FIG. 14 shows a method for assembling a luminaire from a luminaire kit of parts. The steps are not limited to the order below.

In a step of arranging in a light guiding layer step 1404, the set of side-emitting LEDs are arranged in a first type of openings, configured to receive the set of side-emitting LEDs.

In a step of arranging in the light guiding layer step 1406, any of the plurality of the light-out coupling devices from the first and the second light out-coupling structures are arranged in second type of openings, which are configured to receive the first and the second type of light out-coupling devices.

The method may further comprise the steps, prior to the above steps, of:

selecting a set of side-emitting LEDs step 1400, when side-emitting LEDs are selected from the luminaire kit of parts, and selecting any of a plurality of light out-coupling devices step 1402.

Collimators can be mechanically adjusted. Alternatively collimators can be electrically adjusted.

Generally, the luminaries above are examples of possible embodiments of the invention.

The light guiding layer of the luminaire kit of parts described above can be embossed, sand-blasted, or comprise a silk-screened pattern of out-coupling dots, in order to out-couple light gradually from the light guiding layer.

Inserts of light out-coupling devices can be without optical contact with the light guiding layer.

The light guiding layer can comprise mirrors along its edges. The edges are e.g. sides being perpendicular to the surface or surfaces of openings.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A luminaire, comprising:
   a set of light sources,
   a set of light out-coupling devices,
   at least one light guiding element defining
      a first plurality of openings configured to receive at least a subset of light sources of said set of light sources and to direct light generated by said subset of light source into said light guiding element, and
      a second plurality of openings configured to receive at least a subset of light out-coupling devices of the set of light out-coupling devices and to direct light generated by said subset of light source out of said light guiding element.

2. The luminaire according to claim 1, wherein said light guiding element defines a plurality of grooves.

3. The luminaire according to claim 1, wherein each light out-coupling device comprises a light redirector.

4. The luminaire according to claim 3, wherein said light redirector comprises a collimator, a mirror, and/or an optical fiber.

5. The luminaire according to claim 3, wherein said light redirector comprises a phosphor layer being excitable by light from said set of light sources.

6. The luminaire according to claim 3, wherein said first plurality of openings and/or said second plurality of openings extend through said light guiding element.

7. The luminaire according to claim 6, wherein at least a subset of said second plurality of openings are configured to receive said light out-coupling devices from any of a first side of said light guiding element and a second side of said light guiding element, opposite to said first side.

8. The luminaire according to claim 1, wherein the light guiding element comprises light diverters associated with said first plurality of openings, said light diverters being configured to direct light in a direction towards said second plurality of openings.

9. The luminaire according to claim 1, wherein said set of light out-coupling devices comprise fasteners for fastening said light out-coupling devices to said light guiding element, enabling said light out-coupling devices to be detachable from said light guiding element.

10. The luminaire according to claim 1, further comprising a set of light guiding element complements, said set of light guiding element complements being configured to be receivable in said first plurality of openings and said second plurality of openings, wherein light guiding elements complements of said set of light guiding element complements are configured to patch said first plurality of openings and said second plurality of openings.

11. The luminaire according to claim 1, wherein said set of light sources is a set of side-emitting LEDs.

\* \* \* \* \*